United States Patent [19]

Campbell

[11] Patent Number: 4,514,143

[45] Date of Patent: Apr. 30, 1985

[54] AIRCRAFT ROTOR BLADE WITH PASSIVE TUNED TAB

[75] Inventor: Thomas G. Campbell, Cheshire, Conn.

[73] Assignee: The United States of America as represented by the Administrator of the National Aeronautics and Space Administration, Washington, D.C.

[21] Appl. No.: 489,675

[22] Filed: Apr. 28, 1983

[51] Int. Cl.³ .............................................. B64C 13/00
[52] U.S. Cl. ..................................... 416/23; 416/145; 416/500
[58] Field of Search .................... 416/23, 24, 500, 145

[56] References Cited

U.S. PATENT DOCUMENTS

| | | | |
|---|---|---|---|
| 1,990,291 | 2/1935 | Larsen | 416/23 X |
| 2,372,030 | 3/1945 | Stalker | 416/24 X |
| 2,405,208 | 8/1946 | Harris | 416/23 X |
| 2,514,138 | 7/1950 | O'Connor | 416/145 X |
| 2,625,997 | 1/1953 | Doak | 416/23 |
| 2,892,502 | 6/1959 | Donovan | 416/23 |
| 2,950,768 | 8/1960 | Wagner | 416/145 X |
| 3,215,370 | 11/1965 | Strydom | 416/23 X |
| 3,586,460 | 6/1971 | Toner | 416/500 X |
| 3,645,481 | 2/1972 | Purdy | 416/23 X |
| 4,188,171 | 2/1980 | Baskin | 416/500 X |

FOREIGN PATENT DOCUMENTS 550227 12/1942 United Kingdom .................. 416/23

Primary Examiner—Everette A. Powell, Jr.
Attorney, Agent, or Firm—Darrell G. Brekke; John R. Manning; Robert D. Marchant

[57] ABSTRACT

A structure (10) for reducing vibratory airloading in a rotor blade (12) with a leading edge (14) and a trailing edge (16) includes a cut-out portion (18) at the trailing edge. A substantially wedge shaped cross-section, inertially deflectable tab (20), also having a leading edge (22) and a trailing edge (24) is pivotally mounted in the cut-out portion. The trailing edge (24) of the tab (20) may move above and below the rotor blade (12). A torsion strap (26 or 64) applies force against the tab (20) when the trailing edge (24) of the tab (20) is above and below the rotor blade (12). A restraining member (92) is slidably movable along the torsion strap (64) to vary torsional biasing force supplied by the torsion bar (64) to the tab (20). A plurality of movable weights (82) positioned between plates (84) and (86) vary a center of gravity of the tab (20). Skin (74) of the tab (20) is formed from unidirectional graphite and fiberglass layers. Sliders (54 and 56), coupled with a pinned degree of freedom at rod (58) eliminate bending of tab (20) under edgewise blade deflection.

5 Claims, 7 Drawing Figures

AIRCRAFT ROTOR BLADE WITH PASSIVE TUNED TAB

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

TECHNICAL FIELD

This invention relates to an improved aircraft rotor blade incorporating a movable tab which reduces harmonic vibrations which are induced during rotation of the rotor in use. More particularly, it relates to a blade which incorporates such a tab which functions as a passively controlled aeroelastic device for vibration reduction.

BACKGROUND ART

The problem of harmonic vibrations in aircraft propellers, helicopter rotors, turbine blades, and related structures is well recognized. A variety of approaches has been utilized in the prior art for overcoming such vibrations, which reduce the efficiency of rotating, bladed structures. Such approaches typically involve the use of weights associated with the rotor blade structure to provide a better balance or alter the center of gravity of the rotor blade. Such approaches are disclosed in U.S. Pat. Nos. 1,485,788; 2,426,400; 2,430,948; 2,552,727; 3,181,835; and 3,533,714.

While some success has been achieved in reducing harmonic vibrations of rotor blades in the prior art, a need still remains for further improvement of such techniques, particularly for high performance aircraft applications.

SUMMARY OF THE INVENTION

Accordingly, it is an object of this invention to provide an improved rotor blade design which gives an expanded flight envelope and reduces fuel costs.

It is a further object of the invention to provide such a rotor blade design that reduces airframe vibration.

It is still another object of the invention to provide such a rotor blade design with a reduced noise level.

It is a still further object of the invention to provide such a rotor blade design with a reduced system loading.

The attainment of these and related objects may be achieved through use of the rotor blade structure herein disclosed. The rotor blade has an air foil cross-section with a leading edge and a trailing edge. There is a cut-out portion at the trailing edge. A substantially wedge shaped cross-section, inertially deflectable flap or tab, also having a leading edge and a trailing edge, is pivotally mounted at its leading edge in the cut-out portion, so that the trailing edge of the flap or tab may move above and below the rotor blade during rotation of the rotor. A torsion bar connected between the rotor blade and the tab applies force against the tab when the trailing edge of the tab is above and below the rotor blade. A plurality of movable weights are also preferably mounted along the leading edge of the tab for varying a center of gravity of the tab. A slidably movable restraining member on the torsion bar adjusts force applied by the torsion bar.

In use, the structure of this invention may be tuned by adjusting the mass and position of the movable weights and adjusting the torsional force supplied by the torsion bar so that the tab will act to reduce vibratory air loading under different flight conditions utilizing the rotor blade.

The attainment of the foregoing and related objects, advantages and features of the invention should be more readily apparent to those skilled in the art after review of the following more detailed description of the invention, taken together with the drawings, in which:

DETAILED DESCRIPTION OF THE INVENTION

Figure 1:
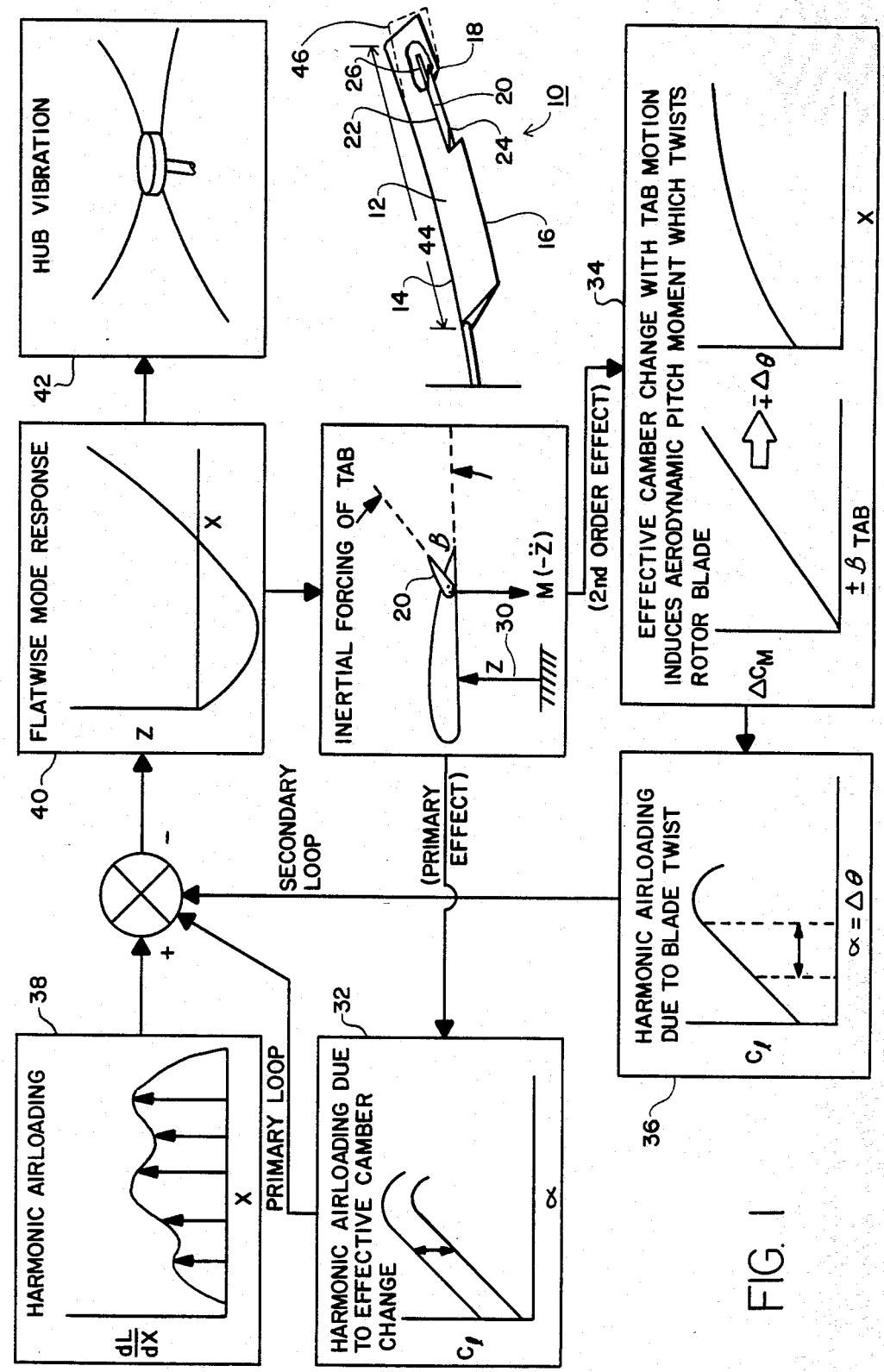
FIG. 1 shows a schematic view of a structure in accordance with the invention and various graphs showing force relationships in the structure.

Turning now to the drawings, more particularly to FIG. 1, there is shown a structure 10 in accordance with the invention in schematic form, which is useful for understanding the force relationships also shown in FIG. 1. The structure 10 includes a rotor blade 12, intended for use in the main drive rotor of a helicopter. The blade 12 has a leading edge 14 and a trailing edge 16. The trailing edge 16 has a cut-out portion 18. A tab 20 in the cut-out portion also has a leading edge 22 and a tailing edge 24. The tab 20 is pivotally mounted along its leading edge 22 in the cut-out portion 18. A torsion bar 26, which applied torsional force to the tab 20 when the tab extends above or below the blade 12, is connected between the blade 12 and the tab 20.

The passive tune tab concept of this invention is based upon (1) the aerodynamic force generation capability of a deflected flap or tab 20, and (2) the response of such a dynamic system when it is harmonically displaced. By tailoring the design parameters of the blade tabe 20 (the dynamic system) which is free to deflect angularly about the tab hinge, the tab 20 can be made to respond to blade 12 vibratory motions in such a manner as to produce beneficial vibratory aerodynamic forces, which result in an overall reduction in the vibratory airloading of blade 12. The resulting force relationship are shown schematically in FIG. 1.

When a blade 12 tab 20 deflects, it creates an incremental normal airload (lift) and pitching moment on the rotor blade, shown at 30. The incremental normal airload 30 results from a camber induced shift of the primary effect lift coefficient for a fixed blade angle of attack, shown at 32. The change in camber also induces a shift in the blade 12 pitching moment coefficient, a second order effect shown at 34, and this creates an additional airload, shown at 36, by twisting the blade to create a change in blade angle of attack. When the tab 20 deflects harmonically, the normal airlift the pitching moment created by tab motion are also harmonic, and can add or subtract from the inherent harmonic airloading, shown at 38, depending upon the amplitude and phase of tab 20 motion. The combination of the forces 32, 36 and 38 creates a flatwise mode response in blade 12, indicated at 40. The result is hub vibration, indicated at 42.

The driving force on the tab 20 is its own inertial forcing as the blade 12 flaps and twists. By offsetting the tab 20 center of gravity from its pivot line at 22, the inertial forcing of the tab 20 can be increased. The tab dynamic response to this inertial forcing can be altered by turning the tab natural frequency through changes in the torsional force applied to the tab 20 when it is above or below the blade 12, applied by the torsion rod 26.

Thus, there is a direct relationship between the motion that is inertially forcing the tab 20 to deflect and the vibration that results from that same motion. Operation of the invention seems to be based on correctly sizing and placing the tab 20 along the rotor blade 12 span and choosing the mass and natural frequency of the tab so that the tab created airloading of optimum amplitude and phase to cancel the inherent harmonic airloading 38 that excites the flatwise modes 40 and induces vibration 42.

To study the effectiveness of the passive tuned tab 20 of this invention, a baseline tab configuration was selected and variations in tab design parameters from the baseline configuration investigated. The baseline configuration of tab 20 is set forth in Table 1 below.

TABLE 1

| | |
|---|---|
| Radius | 26.83 ft (8.179 m) |
| Chord | 1.73 ft (.527 m) |
| Solidity | .082 |
| Tip Speed | 725 ft/sec (221 m/s) |
| Twist | −16 deg (nonlinear) |
| Airfoil | SC 1095, SC 1095R8 |
| Hinge Offset | 1.25 ft (.381 m) |
| Lock Number | 9.13 |
| Flatwise Frequencies/$\Omega$ | 2.85, 5.11, 8.01 |
| Edgewise Frequencies/$\Omega$ | 4.80 |
| Torsional Frequencies/$\Omega$ | 4.22, 13.76 |

Placement of the tab 20 along the blade 12 span 44 is critical for tab 20 effectiveness. Based on predicted vibratory root vertical shears as a function of tab spanwise location for a tab 20 with length equivalent to 10 percent of the blade radius and tab tunings of five vibrations per revolution and ten vibrations per revolution, the tab location for maximum effectiveness was determined to be between 50% and 70% of the blade radius. This result is attributed directly to the influence of the flatwise mode shapes on the excitation of the tab 20. Both first and second flatwise modes have antinodes in this region, and since the tab is inertially excited by the blade flatwise motion, more excitation occurs at flatwise antinodes than at flatwise nodes. The node points for these two flatwise modes are between 75% and 90% of blade radius, and this is the region of lowest tab effectiveness. In fact, amplification of four per revolution root vertical shears also occurs in this region. The blade tip 46 is also an antinode for the blade flatwise modes, but effectiveness for a tab 20 located at the blade tip 46 is not as good as for a tab 20 near midspan. The reason for this apparent anomaly is based on the influence of the rigid body flatwise mode on tab excitation. Even though the rigid body flatwise mode contributes little to the root vertical shear, its motion is appreciable at 3, 4, and 5 per revolution. In fact, the rigid body flatwise mode has more motion at 3, 4 and 5 per revolution than the second flatwise mode. The influence of the rigid body mode on the tab excitation is therefore detrimental because the tab responds to null the vertical motion regardless of the vertical shear caused by the vertical motion. Based on the rigid body flatwise mode shape, an inboard tab location is better than an outboard tab location, in order to reduce the tab response to the rigid body mode. For example, at midspan the rigid body flatwise mode shape has only half the deflection at the blade tip 46, so the influence of the rigid body flatwise mode on the tab response is also cut in half.

Reduction in the vibratory root vertical shears also varies with tab tuning. The five tab vibrations per revolution tuning provides better blade 12 vibration alleviation than the 10 tab vibrations per revolution tuning. Tab angular motion increases with a decrease in tab natural frequency, and increased tab motion provides increased control authority. For a tab 20 located at 60% radius of the blade 12 with a five per revolution tuning, the percent reduction in vibratory shears is 54%, 15% and 88% for 3, 4, and 5 blade vibrations per revolution, respectively. However, the tab angular motions associated with this level of root shear reduction may violate design constraints.

For a tab 20 located at 60% radius with a five per revolution tuning, amplitudes of harmonic tab motion reach 7 degrees, and when the harmonic amplitudes at 3, 4, and 5 blade vibrations per revolution are summed, the total is about 14 degrees. The present design constraint on tab motion is plus or minus 7 degrees, so tab effectiveness must be compromised by decreasing tab motion to satisfy this design constraint. For the same tab with a 10 vibrations per revolution tuning, the tab harmonic motions are appreciably lower. The sum of the harmonic amplitudes at 3, 4, and 5 blade vibrations per revolution is about 5 degrees, which is acceptable. The reduction in root vertical shears for a tab located at 0.60R with a 10 per revolution tuning is 42%, 30% and 51% for 3, 4, and 5 blade vibrations per revolution, respectively. These results indicate that the design constraint on tab angular motion of plus or minus 7 degrees can be met while maintaining appreciable reductions of vibratory root vertical shears. Based upon these results, the selected tab location is near 60% radius and the selected tuning is 10 per revolution.

Another important design parameter influencing the effectiveness of the passive tab 20 is the length of the tab. An increase in tab length increases the control surface area, which augments the control authority of the tab. All three harmonics of root vertical shear decrease with an increase in tab length. For example, the three per revolution vertical shear decreases by an additional 20% by lengthening the tab from 10 percent radius to 15 percent radius. Tab lengths greater than 15 percent radius are less satisfactory because greater lengths may cause excess design complications and diminishing benefits. Tab angular amplitude also decreases slightly for increased tab length. These results mean that increases in tab effectiveness can be realized by using a tab length of 15 percent radius instead of a 10 percent radius, as in the baseline tab configuration, without violating the design constraint on tab amplitude. For this reason, a tab length of 15 percent radius with the tab located between 0.50R and 0.65R is preferred.

Another method to augment the control authority of the passive tab 20 is to increase the tab chord, since this also increases the control surface area. Increases in tab chord improve the reduction in root vertical shears, but not nearly as strongly as an increase in tab spanwise length. The biffer payoff is a reduction in the amplitude of tab angular motions with increased tab chord. For example, for a tab with a 2.1 inch (0.053 m) chord, which is 10 percent of the blade 12 chord, the sum of harmonic tab motions is 4.5 degrees. As previously noted, tab angular motion is an important consideration in the design, and for this reason the selected tab configuration has a 4.2 inch (0.1067 m) chord, which is 20 percent of the blade chord.

Increases in tab 20 weight have a beneficial effect on vibratory root vertical shears as expected, since the tab is an inertially driven mechanism which is sensitive to blade flatwise motion. The added weight therefore increases the tab motion, and this results in larger aerodynamic forces generated by the tab. Results also show that there is an optimum tab weight for three and four per revolution root vertical shears, above which increases in tab weight reduce effectiveness. The interpretation of this effect is that the tab may be overdriven for high values of tab weight, which could result in overcorrection, either through amplitude or phase. A tab weight of 7.3 pounds (3.311 kg) was selected for the tab configuration. This value of tab weight provides a high level of vibration alleviation for an acceptable level of harmonic tab motion.

The tab center of gravity location is an important design parameter since it largely determines the mass moment of inertia of the tab about its pivot line, and this in turn influences the inertial response of tab angular motions to the blade flatwise motions. The tab reduces the vibratory root vertical shears for all forward center of gravities and amplifies the root shears for all of the aft center of gravity locations. There are diminishing benefits for centers of gravity located farther forward than one inch (0.025 meter), except that tab angular motion is decreased. Based upon these results, the center of gravity selected for the tab configuration is 25% of the tab chord (one inch forward of the pivot line).

Based on the above tradeoff studies, the tab configuration shown in Table 2 below was selected as that providing best overall performance with low deflection angles.

TABLE 2

| Recommended Passive Tuned Tab Configuration | |
|---|---|
| Spanwise location | .50 R to .65 R |
| Chord | .20 C |
| Weight | 7.3 lbs (3.311 kg) |
| Center of Gravity | 1 inch (.025 m) forward of tab axis |
| Tuning | 43 Hz (10 per rev) |

Relative to the baseline design, the design of Table 2 is 50% longer and 45% heavier. The final reduction in vibratory hub loads and the required tab motions for a 175 knot flight condition of a helicopter incorporating the structure of this invention are shown below in Table 3.

TABLE 3

| Root Vertical Shears at Design Condition With and Without Tuned Trailing Edge Tabs | | | | |
|---|---|---|---|---|
| Harmonic | Without Tab lbs (n) | With Tab lbs (n) | Reduction % | Tab Amplitude deg |
| 3 per rev | 810 (3603.) | 332 (147.7) | 59 | 2.2 |

TABLE 3-continued

| Root Vertical Shears at Design Condition With and Without Tuned Trailing Edge Tabs | | | | |
|---|---|---|---|---|
| Harmonic | Without Tab lbs (n) | With Tab lbs (n) | Reduction % | Tab Amplitude deg |
| 4 per rev | 240 (1067) | 154 (685) | 36 | 1.7 |
| 5 per rev | 80 (356) | 27 (120) | 66 | 0.8 |

As shown, 59%, 36% and 66% reduction in 3, 4, and 5 vibrations per revolution vertical root shears are obtainable. Table 4 shows suitable parameter ranges for the tab 20, based on the above considerations.

TABLE 4

| Recommended Ranges for Tab Parameters | |
|---|---|
| Tab Weight | 5–15 lbs (2.27–6.80 kg) |
| Tab Center-of-Gravity | 0–2 inches (.051 m) forward of hinge |
| Tab Frequency | 0–20 per rev |

The tab configuration which was selected for the 175 knot condition reduces vibratory loads at all speeds. The tab performs particularly well in reducing the three per revolution vertical shear, which is by far the largest. The tab becomes less effective at the lowest flight speeds where the level of vibratory shear is the lowest. This is primarily because the tab has less than 0.5 degree angular response, since the excitation is low. Tab effectiveness can be substantially increased at the lower flight speeds by lowering the tab tuning from 10 vibrations per revolution to allow more tab motion. The 10 per revolution tab tuning is necessary to eliminate tab motion at the higher air speeds. It may therefore be desirable to provide an inflight variable tab tuning capability to provide greater vibration alleviation over the entire flight speed range if necessary.

Evaluation of the passive tuned tab on a hingeless rotor as well as on the baseline articulated rotor design gives similar reductions in root vertical shears and indicates that the passive tuned tab is also effective on a hingeless rotor design.

FIGS. 2–7 show details of a preferred embodiment of a passive tuned tab 20 in accordance with the invention. Cut-out portion 18 of the blade 12 has slider guides 50 and 52, to receive sliders 54 and 56, respectively, which extend from leading edge 22 of the tab 20. Inboard rod end 58 of the tab 20 is attached directly to an inboard rib of the blade 12 at 60. The inboard rod end 58 is designed to react all the centrifugal load of the tab 20. Reacting all the tab centrifugal force at one bearing was necessary to eliminate binding. The sliders 54 and 56 are in turn attached to their respective support ribs at 50 and 52. The sliders 54 and 56 are necessary to eliminate the large spanwise loading which would be present under edgewise blade deflections with rigid connections.

The sliders 54 and 56, coupled with a pinned degree of freedom at rod 58, also provide the necessary kinematics to eliminate tab bending under enforced edgewise blade deflection. Access panels 62 are provided at each support point 60, 50 and 52, and at the location of torsion bar or strap 64 to provide ease of installation. The access panels 62 are also used to react the flatwise loads on the rod ends.

The tab 20 is constructed to be lightweight with a center of gravity 70 (FIG. 5) as close to the leading edge 22 as possible. An aluminum tube 72 is utilized as a tab spar. A skin 74 of ±45°/0° graphite wraps around the spar 72 and is bonded together at trailing edge 24. A layer of fiberglass skin overlays the graphite skin.

Figure 6:
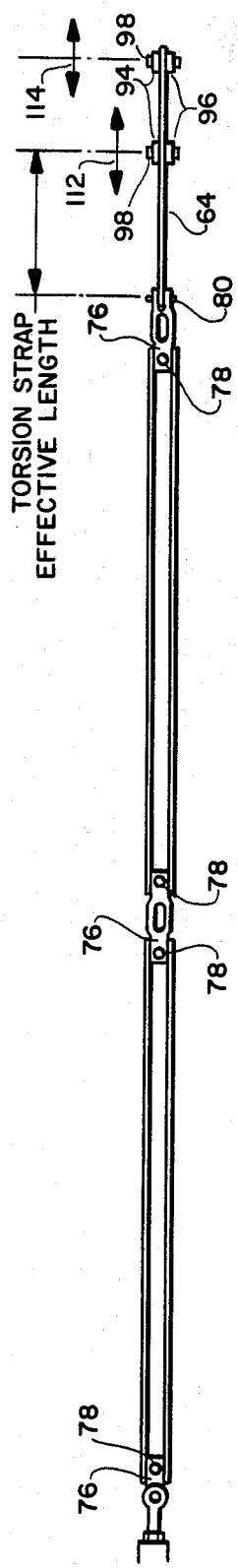
FIG. 6 is another cross-section view, taken along the line 6—6 in FIG. 2.
Figure 7:
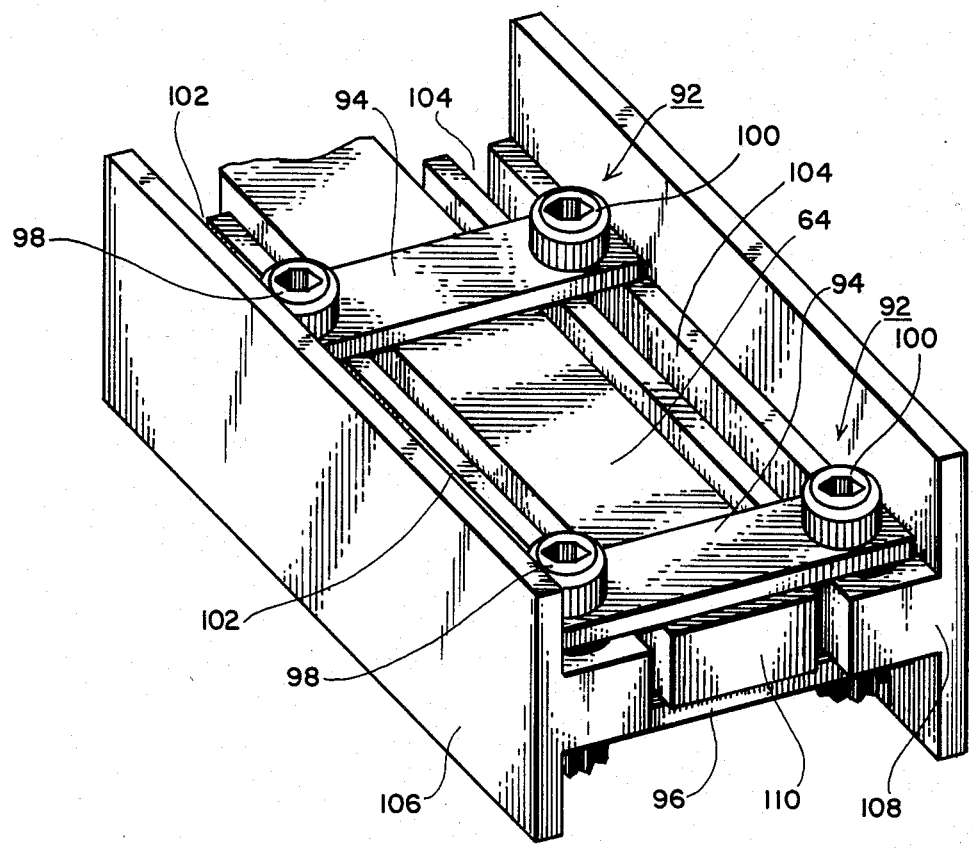
FIG. 7 is an enlarged perspective view of area 7 in FIG. 2.

The rod ends 58, 59 and 61 are attached to the tab 20 as shown in FIG. 6. Steel adapters 76 are pressed within the spar tube 72 and shear pins 78 are installed to transfer centrifugal and torsion loads to the adapters 76. The outboard adapter 76 has an additional clevis at 80 for attaching to torsion strap 64, used to provide the variable spring rate of the structure.

Figure 2:
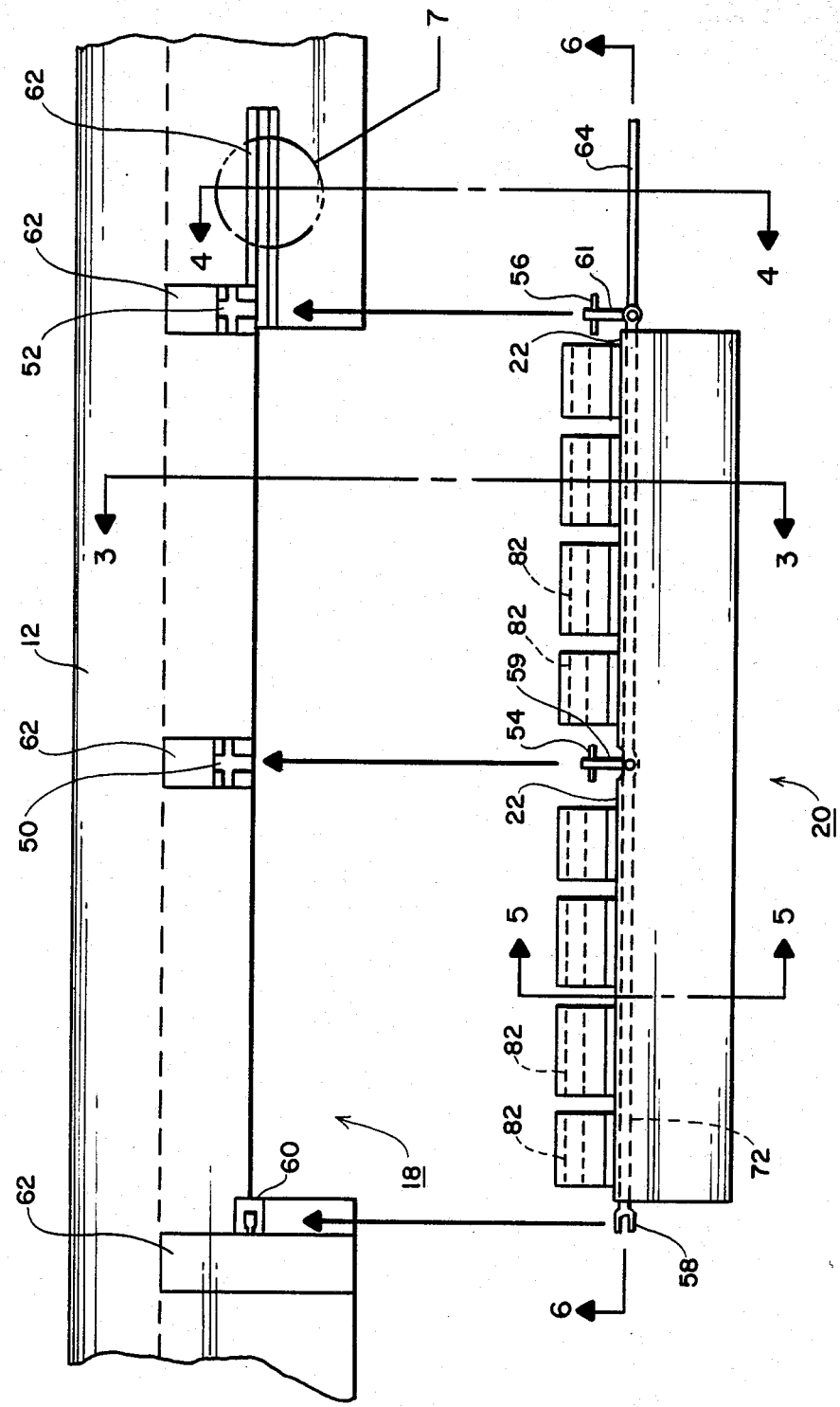
FIG. 2 is a plan view of an embodiment of a structure in accordance with the invention.
Figure 5:
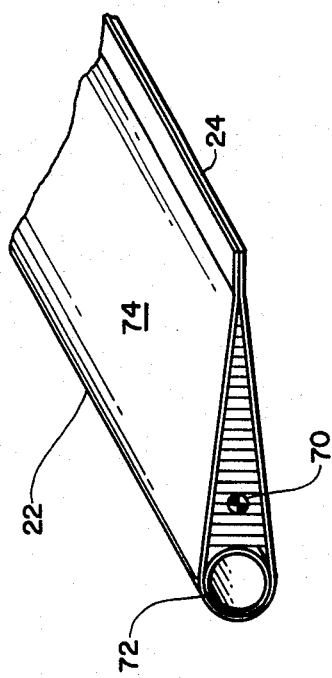
FIG. 5 is a perspective view taken from the cross-section line 5—5 in FIG. 2.
Figure 3:
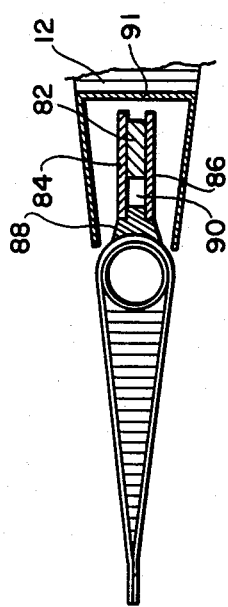
FIG. 3 is a cross-section view, taken along the line 3—3 in FIG. 2.
Figure 4:
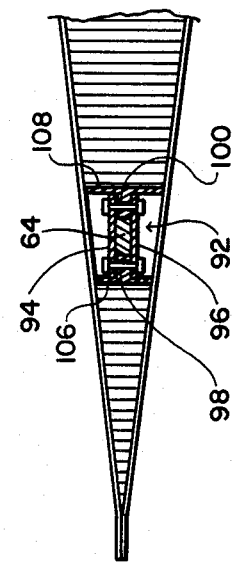
FIG. 4 is a cross-section view, taken along the line 4—4 in FIG. 2.

Variable tab weights 82 are attached to the tab 20, as indicated in FIG. 2. Details of the weight system are shown in FIG. 3. A pair of aluminum plates 84 and 86 are bonded to spar 72 at 88 to define an enclosure 90 for weights 82. The weights 82 are tungsten and can be varied in chordwise location as well as in the amount of weight used. The weight assembly as shown can provide a maximum center of gravity offset of 1.05 inches (0.027 m) for a maximum tab assembly weight of 9.3 pounds (4.22 kg). FIG. 3 also shows a graphite channel section 91, which is bonded to the blade 12 behind cut-out portion 18 to restore the structural integrity of the blade 12, otherwise compromised by removal of the trailing edge 16 of the blade 12 at cut-out 18 (see also FIGS. 1 and 2).

Details of torsion strap 64 and its related assembly are shown in FIGS. 2, 4, 6 and 7. The torsion strap 64 is used to provide the torsional spring rate of the system. The torsion strap 64 is fabricated from graphite with a predominant orientation of ±45° to provide the maximum torsional stiffness possible. The spring rate can be varied by installing straps 64 with various cross-sections to give proper stiffness with acceptable shear strains, and also by varying the effective length of the strap by means of torsion strap slider 92, which consists of plates 94 and 96, clamped on each side of the torsion strap 64 by bolts 98 and 100, and which can be positioned at various points along the torsion strap 64 to vary its effective length. The bolts 98 and 100 are passed through channels 102 and 104 of supports 106 and 108 to anchor the strips 94 and 96. The second slider 92 at end 110 of strap 64 supports the end 110, but can also be moved to shorten the effective length of the strap 64 in the same manner as the other slider 92, as indicated by arrows 112 and 114 in FIG. 6. The slider 92 is designed to provide torsional restraint while at the same time allowing relative motion spanwise to prevent buckling under edgewise blade deflection.

It should now be readily apparent to those skilled in the art that a novel rotor blade structure capable of achieving the stated objects of the invention has been provided. Due to the inertial response of the pivotally mounted tab 20, harmonic vibrations of blade 12 are dampened, thus reducing vibratory airloading on the blade 12. The tab 20 is incorporated into the airfoil profile of the blade 12 with a minimum of alteration to the airfoil, primarily structural strengthening to support the somewhat greater weight.

It should further be apparent to those skilled in the art that various changes in form and details of the invention as shown and described may be made. For example, elastomeric bearings may be substituted for the spherical bearings in rod ends 76. It is intended that such changes be included within the spirit and scope of the claims appended hereto.

What is claimed is:

1. A structure for reducing vibratory airloading in a rotor blade which comprises a rotor blade having an airfoil cross-section with a leading edge and a trailing edge and a cut-out portion at the trailing edge, a substantially wedge shaped cross-section, inertially deflectable tab having a leading edge, a trailing edge, and a pivot axis near the leading edge, said tab being pivotally mounted in said cut-out portion so that said tab may rotate about said pivot axis and the trailing edge of said tab may move above and below said rotor blade, weight means secured to the leading edge of said tab for maintaining the center of gravity of said tab and weight means between said pivot axis and said blade leading edge, a torsion bar biasing means connected between said rotor blade and said tab for applying force against said tab when the trailing edge of said tab is above and below said rotor blade, said biasing means including a torsion bar and a torsion bar restraining member slidably movable along said torsion bar to vary the torsional biasing force supplied by said torsion bar to said tab.

2. The structure of claim 1 wherein the distance of the weights from the tab leading edge may be varied to move said center of gravity.

3. The structure of claim 2 in which said weight means comprises at least one weight and two plates, said plates each having an end supported by said tab leading edge and another end extending toward the leading edge of said blade, and said weight being positioned between said plates.

4. The structure of claim 1 in which said tab is formed from a tubular metallic spar, a honeycomb core positioned longitudinally along said spar, with said spar constituting the leading edge of said tab, said core tapering away from said spar to define the trailing edge of said tab, and a skin formed over said spar and honeycomb core, said skin being bonded together at the trailing edge of said tab.

5. The structure of claim 1 wherein said torsion bar has a longitudinal axis coincident with said tab pivot axis and said torsion bar is free to move with respect to said restraining member in a direction along said longitudinal axis.

* * * * *